(12) United States Patent
Wagoner et al.

(10) Patent No.: US 8,138,620 B2
(45) Date of Patent: Mar. 20, 2012

(54) METHODS AND SYSTEMS FOR OPERATING A WIND TURBINE POWER CONVERTER

(75) Inventors: Robert Gregory Wagoner, Roanoke, VA (US); Anthony Klodowski, Hardy, VA (US)

(73) Assignee: General Electric Company, Schenectady, NY (US)

( * ) Notice: Subject to any disclaimer, the term of this patent is extended or adjusted under 35 U.S.C. 154(b) by 405 days.

(21) Appl. No.: 12/483,442

(22) Filed: Jun. 12, 2009

(65) Prior Publication Data

US 2010/0314872 A1 Dec. 16, 2010

(51) Int. Cl.
*F03D 9/00* (2006.01)
*H02P 9/04* (2006.01)

(52) U.S. Cl. .......................................... 290/44; 290/55
(58) Field of Classification Search .................. 290/44, 290/55
See application file for complete search history.

(56) References Cited

U.S. PATENT DOCUMENTS

| | | | | |
|---|---|---|---|---|
| 5,073,849 | A * | 12/1991 | Morris | 363/21.03 |
| 5,119,059 | A | 6/1992 | Covi et al. | 336/175 |
| 5,125,027 | A * | 6/1992 | Blaszykowski et al. | 379/399.01 |
| 5,521,809 | A * | 5/1996 | Ashley et al. | 363/71 |
| 6,433,493 | B1 * | 8/2002 | Ilyes et al. | 315/291 |
| 6,490,181 | B1 | 12/2002 | Liu et al. | 363/40 |
| 6,680,856 | B2 * | 1/2004 | Schreiber | 363/71 |
| 6,751,106 | B2 * | 6/2004 | Zhang et al. | 363/71 |
| 6,917,271 | B2 * | 7/2005 | Zhang et al. | 336/160 |
| 6,946,750 | B2 * | 9/2005 | Wobben | 290/44 |
| 7,256,508 | B2 | 8/2007 | Altemark et al. | 290/44 |
| 7,324,360 | B2 * | 1/2008 | Ritter et al. | 363/71 |
| 7,439,714 | B2 | 10/2008 | Llorente Gonzalez et al. | 322/24 |
| 7,446,435 | B2 | 11/2008 | Zhang et al. | 307/105 |
| 7,545,052 | B2 * | 6/2009 | Llorente Gonzalez et al. | 290/44 |
| 7,852,643 | B2 * | 12/2010 | Zhang et al. | 363/65 |
| 7,928,592 | B2 * | 4/2011 | Wagoner et al. | 290/44 |
| 7,939,959 | B2 * | 5/2011 | Wagoner et al. | 290/55 |
| 7,944,068 | B2 * | 5/2011 | Wagoner et al. | 290/44 |
| 2004/0017689 | A1 | 1/2004 | Zhang et al. | 363/71 |

(Continued)

FOREIGN PATENT DOCUMENTS

EP 1768223 A2 3/2007

(Continued)

OTHER PUBLICATIONS

Common Mode Choke Theory, Butler Winding, http://www.butlerwinding.com/inductors/common-mode2.html, 2008, 2 pages, Wist Enterprises, Inc., US.

(Continued)

*Primary Examiner* — Pedro J Cuevas
(74) *Attorney, Agent, or Firm* — James McGinness, Esq.; Armstrong Teasdale LLP (57) ABSTRACT

A method for providing an output power to a load is described. The method includes coupling a multi-thread power converter system to an alternating current (AC) generator and to a load and monitoring at least one operating characteristic of the AC generator. The method also includes providing the multi-thread power converter system with one of a first switching pattern and a second switching pattern based at least partially on the at least one monitored operating characteristic. The method also includes configuring the multi-thread power converter system to operate in accordance with the first switching pattern and the second switching pattern and to convert an AC input power provided by the generator to an output power for delivery to the load.

29 Claims, 8 Drawing Sheets

U.S. PATENT DOCUMENTS

| | | | |
|---|---|---|---|
| 2004/0196677 A1* | 10/2004 | Zhang et al. | 363/71 |
| 2006/0103137 A1* | 5/2006 | Wobben | 290/44 |
| 2006/0214428 A1* | 9/2006 | Altemark et al. | 290/44 |
| 2007/0073445 A1* | 3/2007 | Llorente Gonzalez et al. | 700/286 |
| 2007/0121353 A1* | 5/2007 | Zhang et al. | 363/39 |
| 2008/0106100 A1* | 5/2008 | Hyvarinen | 290/44 |
| 2009/0001725 A1 | 1/2009 | Llorente Gonzalez et al. | 290/44 |
| 2009/0109713 A1 | 4/2009 | Schnetzka | 363/34 |
| 2009/0322081 A1* | 12/2009 | Wagoner et al. | 290/44 |
| 2009/0322082 A1* | 12/2009 | Wagoner et al. | 290/44 |
| 2009/0322083 A1* | 12/2009 | Wagoner et al. | 290/44 |
| 2010/0109582 A1* | 5/2010 | Terode | 318/400.2 |

FOREIGN PATENT DOCUMENTS

| | | |
|---|---|---|
| EP | 1796254 A2 | 6/2007 |
| EP | 2009779 A2 | 12/2008 |

OTHER PUBLICATIONS

Fen Tang et al: "Parallel Interleaved Grid-connected Converters in MW-level Wind Power Generation", Electric Machines and Drives Conference, May 3, 2009, pp. 789-796, IEEE International, IEEE, Piscataway, NJ, USA, XP031475862, ISBN: 978-1-4244-4251-5.

EP, European Search Report and Written Opinion issued in connection with EP Patent Application No. 10164208.0, Sep. 27, 2010.

* cited by examiner

METHODS AND SYSTEMS FOR OPERATING A WIND TURBINE POWER CONVERTER

BACKGROUND OF THE INVENTION

The field of the disclosure relates generally to wind turbine power generation and more specifically to improving wind turbine efficiency by reducing power losses present in a wind turbine power converter.

A wind turbine uses wind to generate electricity. A wind turbine typically includes a nacelle that houses an electric generator. The wind turbine also typically includes a rotor that includes a plurality of rotor blades attached to a rotating hub. The wind turbine rotor is coupled to the electric generator, wherein the wind turbine rotor converts wind energy into rotational energy that is used to rotate a rotor of the electric generator. Variable speed operation of the wind turbine facilitates enhanced capture of energy by the turbine when compared to a constant speed operation of the turbine. However, variable speed operation of the wind turbine produces electricity having varying voltage and/or frequency. More specifically, the frequency of the electricity generated by the variable speed wind turbine is proportional to the speed of rotation of the rotor. A power converter may be coupled between the electric generator and a utility grid. The power converter outputs electricity having a fixed voltage and frequency for delivery on the utility grid.

Some known power converters include semiconductor switches capable of handling high currents and voltages. Typically, rapid switching of the semiconductor switches is beneficial to the quality of the power output of the converter. However, the semiconductor switches may not be able to operate at high frequencies due to thermal limitations. To overcome the thermal limitations, a filter and a choke may be coupled to the output of the semiconductor switches to filter harmonic content from the electricity. Such filtering may adversely impact the efficiency of the power converters.

BRIEF DESCRIPTION OF THE INVENTION

In one aspect, a method for providing an output power to a load is provided. The method includes coupling a multi-thread power converter system to an alternating current (AC) generator and to a load and monitoring at least one operating characteristic of the AC generator. The method also includes providing the multi-thread power converter system with one of a first switching pattern and a second switching pattern based at least partially on the at least one monitored operating characteristic. The method also includes configuring the multi-thread power converter system to operate in accordance with the first switching pattern and the second switching pattern and to convert an AC input power provided by the generator to an output power for delivery to the load.

In another aspect, a power generation system for providing an output power to a load is provided. The power system includes a generator configured to generate an alternating current (AC) input power and a power converter system coupled to the generator. The power converter system includes a plurality of converter threads configured to convert the AC input power to an output power and to provide the output power to the load. The power system also includes a converter control system coupled to the power converter system. The converter control system is configured to provide the power converter system with one of a first switching pattern and a second switching pattern based at least partially on a monitored operating characteristic of the generator.

In yet another aspect, a method for increasing an efficiency of a multi-thread power converter system is provided. The method includes positioning a common mode inductor within at least one thread of a multi-thread power converter system. The common mode inductor includes at least one air gap. The method also includes determining a flux density of the common mode inductor and determining a maximum common mode inductance value for the common mode inductor that maintains the flux density of the common mode inductor within a predetermined range. The method also includes configuring the common mode inductor to provide the determined common mode inductance value.

DETAILED DESCRIPTION OF THE INVENTION

Various embodiments described herein include a wind turbine and, more particularly, a power converter system for use with the wind turbine. Technical effects of the various embodiments include improving efficiency of the power converter system by reducing power converter losses. Although described as included within a wind turbine, the power converter system described herein may be included within, or coupled to, any suitable power generation source for conversion of an input power to an output power.

Figure 1:
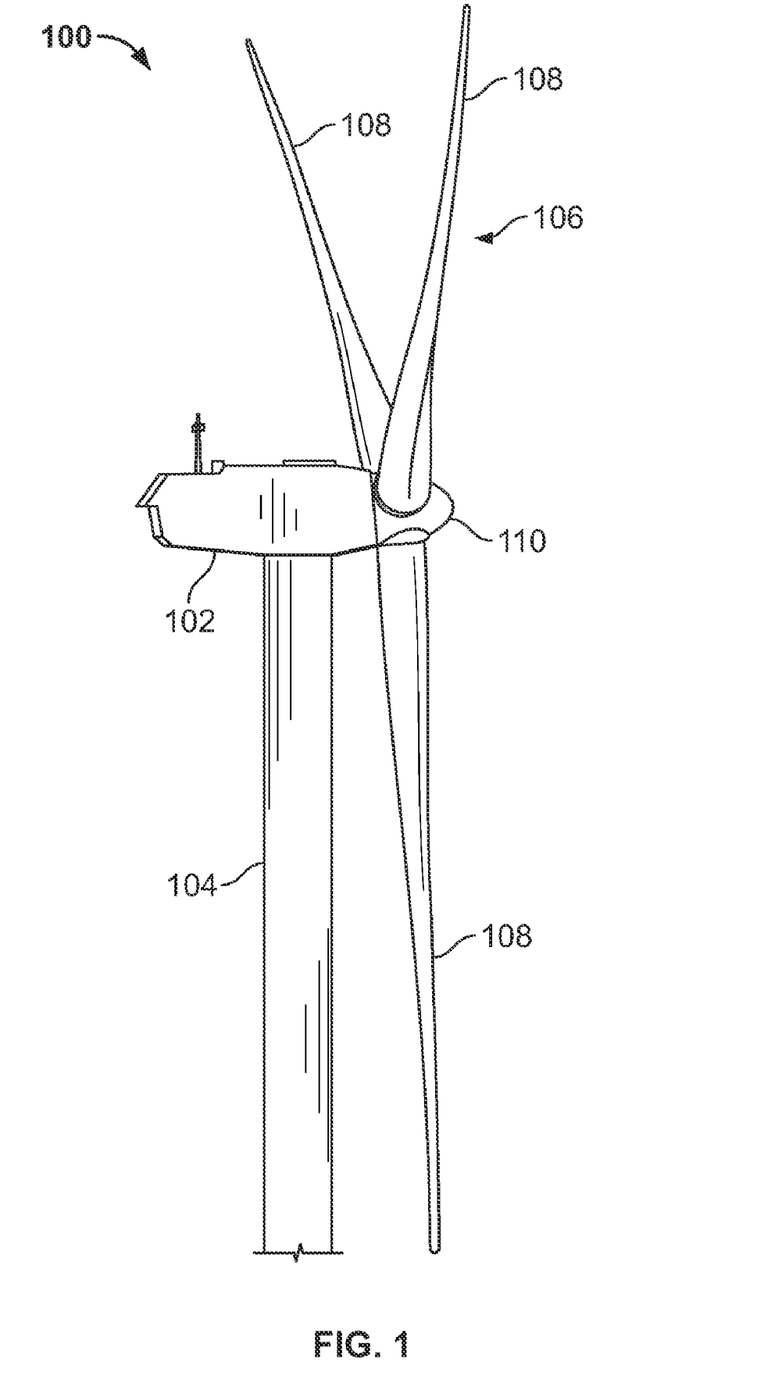
FIG. 1 is a side perspective view of an exemplary embodiment of a wind turbine.

FIG. 1 is a side perspective view of an exemplary embodiment of a wind turbine 100. Wind turbine 100 generally includes a nacelle 102 housing a generator (not shown in FIG. 1). Nacelle 102 is mounted on a tower 104, a portion of which is shown in FIG. 1. Wind turbine 100 also includes a rotor 106 that includes a plurality of rotor blades 108 attached to a rotating hub 110. Although wind turbine 100 illustrated in FIG. 1 includes three rotor blades 108, there are no specific limits on the number of rotor blades 108 required by the various embodiments described herein. Thus, additional or fewer rotor blades 108 may be provided.

Figure 2:
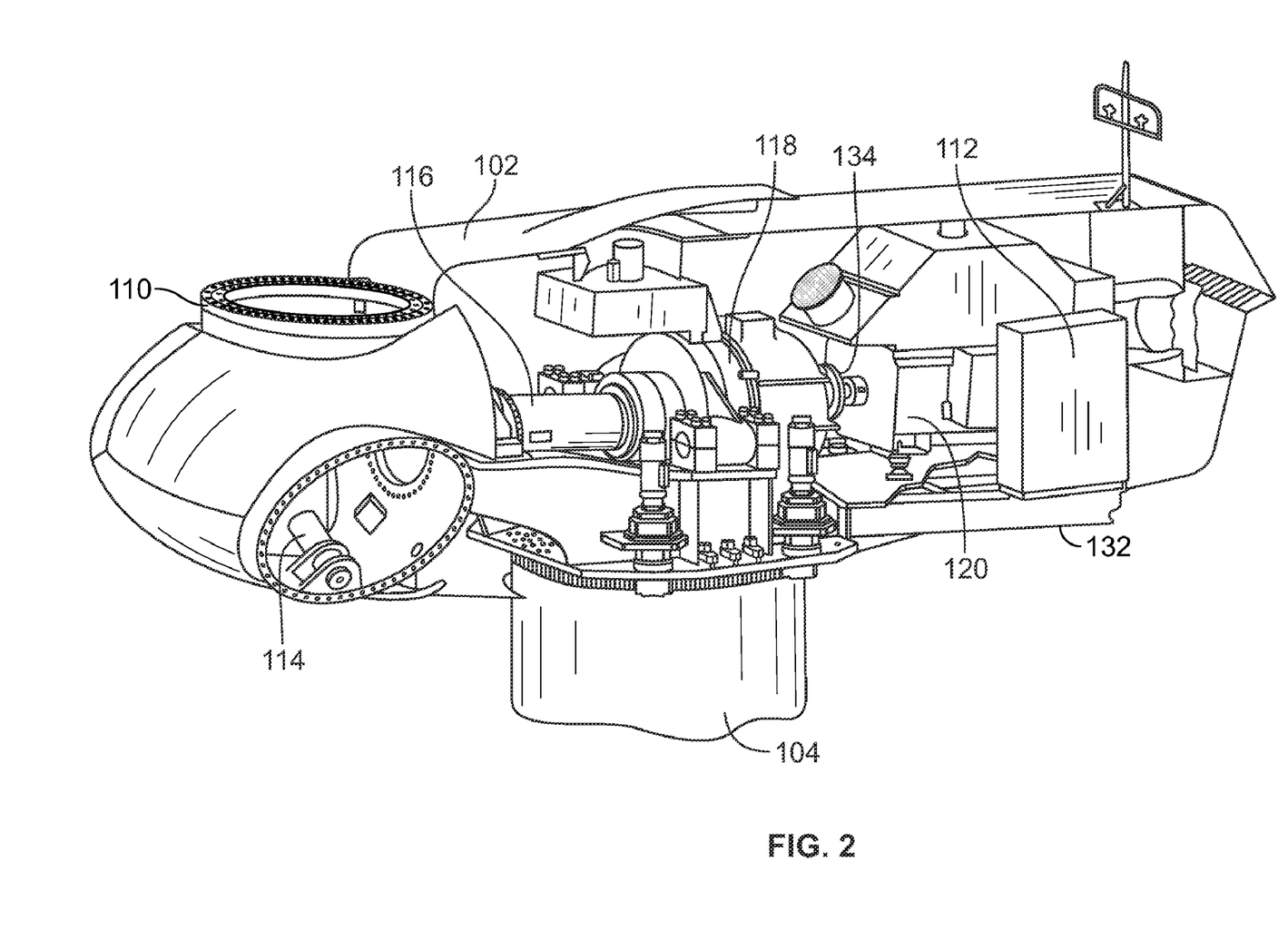
FIG. 2 is a cut-away perspective view of a nacelle of the exemplary wind turbine shown in FIG. 1.

FIG. 2 is a cut-away side perspective view of nacelle 102 (shown in FIG. 1). In the exemplary embodiment, various components are housed in nacelle 102 on tower 104 of wind turbine 100. Further, a height of tower 104 may be selected based upon factors and conditions known in the art. In some embodiments, one or more microcontrollers (not shown in FIG. 2) within a control panel 112 form a control system used for overall system monitoring and control including pitch and speed regulation, high-speed shaft and yaw brake application, yaw and pump motor application, and power level and fault monitoring. Alternative distributed or centralized control architectures may be used in some embodiments.

In various embodiments, the control system provides control signals to a variable blade pitch drive 114 to control the pitch of blades 108 (shown in FIG. 1) that drive hub 110 as a result of wind. Hub 110 and blades 108 together form wind turbine rotor 106 (shown in FIG. 1). The drive train of wind turbine 100 includes a main rotor shaft 116 (also referred to as a "low speed shaft") connected to hub 110 and a gear box 118 that, in some embodiments, utilizes a dual path geometry to drive a high speed shaft enclosed within gear box 118. The high speed shaft (not shown in FIG. 2) is used to drive a generator 120 that is supported by a main frame 132. In some embodiments, rotor torque is transmitted via a coupling 134. Generator 120 may be of any suitable type, for example and without limitation, a wound rotor induction generator, such as a doubly fed induction generator. Another suitable type by way of non-limiting example is a multi-pole generator that can operate at the speed of the main rotor shaft 116 in a direct drive configuration, without requiring a gearbox.

Figure 3:
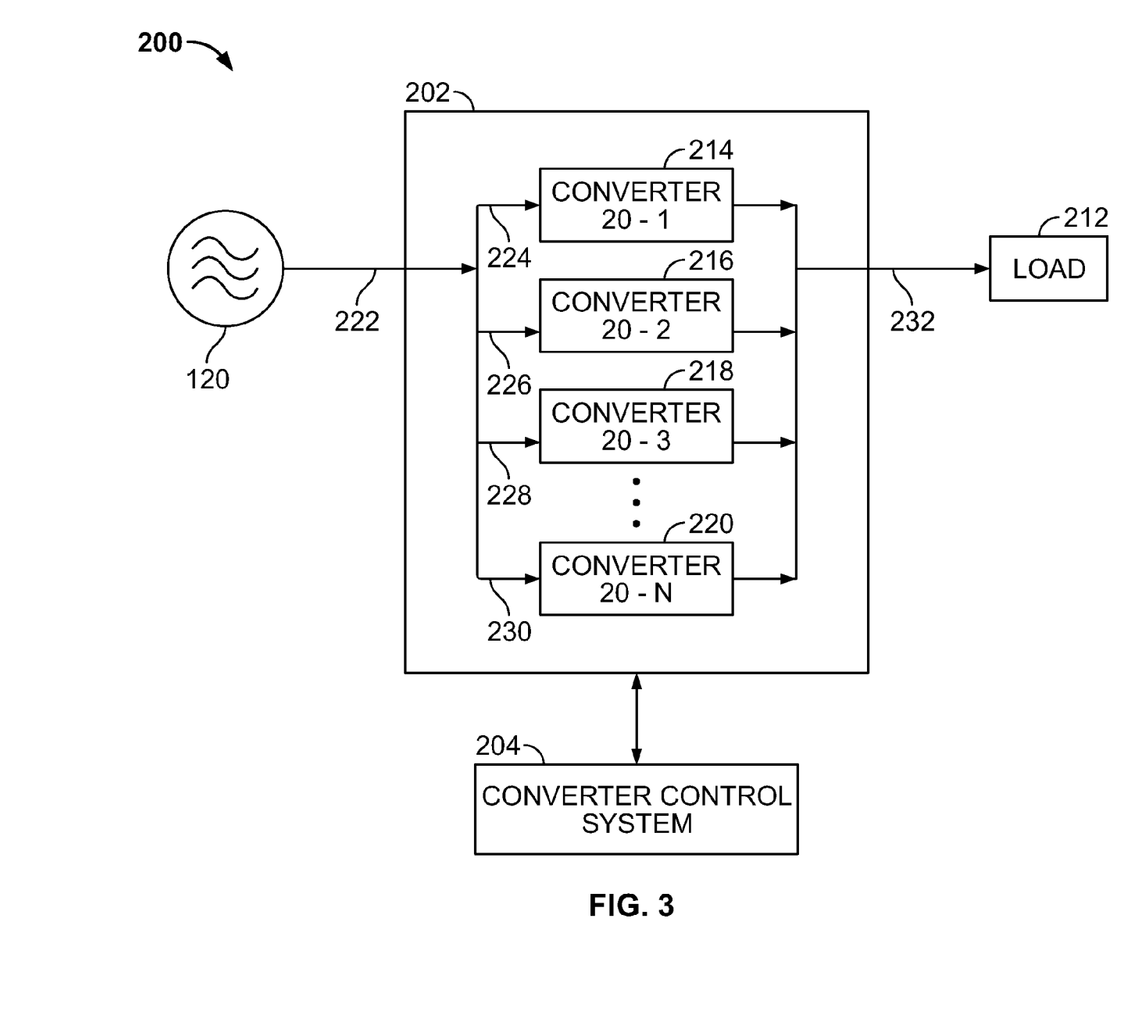
FIG. 3 is a block diagram of an exemplary embodiment of a power system that includes a power converter system.

FIG. 3 is a block diagram of an exemplary embodiment of a power generation system 200 that includes a multi-thread power converter system 202. In the exemplary embodiment, power generation system 200 includes generator 120 (shown in FIG. 2), power converter system 202, and a converter control system 204. In the exemplary embodiment, power generation system 200 is at least partially positioned within nacelle 102 (shown in FIG. 1). Power generation system 200 is configured for supplying power to a load 212. In the exemplary embodiment, power converter system 202 includes a plurality of power converters, for example, converters 214, 216, 218, and 220. Although illustrated as including four converters 214, 216, 218, and 220, any suitable number of converters may be included that enables power converter system 202 to function as described herein.

Generator 120 is configured to generate an alternating current (AC) power. Because the AC power generated by generator 120 is provided to power converter system 202, the generated AC power is referred to herein as an AC input power 222. Converters 214, 216, 218, and 220 are coupled in parallel and configured to receive AC input power 222 from generator 120. Each converter 214, 216, 218, and 220 is included within a converter thread, for example, converter threads 224, 226, 228, and 230, respectively. Power converter system 202 is configured to convert AC input power 222 to an output power 232. Output power 232 is provided to load 212. In the exemplary embodiment, AC input power 222 has a variable frequency. Power converter system 202 may be configured to convert the variable frequency AC input power 222 to a fixed frequency output power 232. Load 212 may include, but is not limited to including, motors, power grids, and/or resistive loads. Although grids are traditionally suppliers of power, in some wind turbine system embodiments, wind turbine power is supplied to a utility grid which acts as a load in such embodiments.

In the exemplary embodiment, converter control system 204 is configured to provide control signals for the operation of power converter system 202. Converter control system 204 may be configured to operate switches (not shown in FIG. 3) within converters 214, 216, 218, and 220 at predetermined frequencies to generate an output power having a desired output voltage and frequency. In some embodiments, converter control system 204 is coupled to power converter system 202 and is configured to drive power converter system 202 in an interleaved pattern. The operation of power converter system 202 in the interleaved pattern controls each converter 214, 216, 218, and 220 with phase displaced gating signals and reduces overall switching harmonic components due to cancellation of phase shifted switching waveforms.

Figure 4:
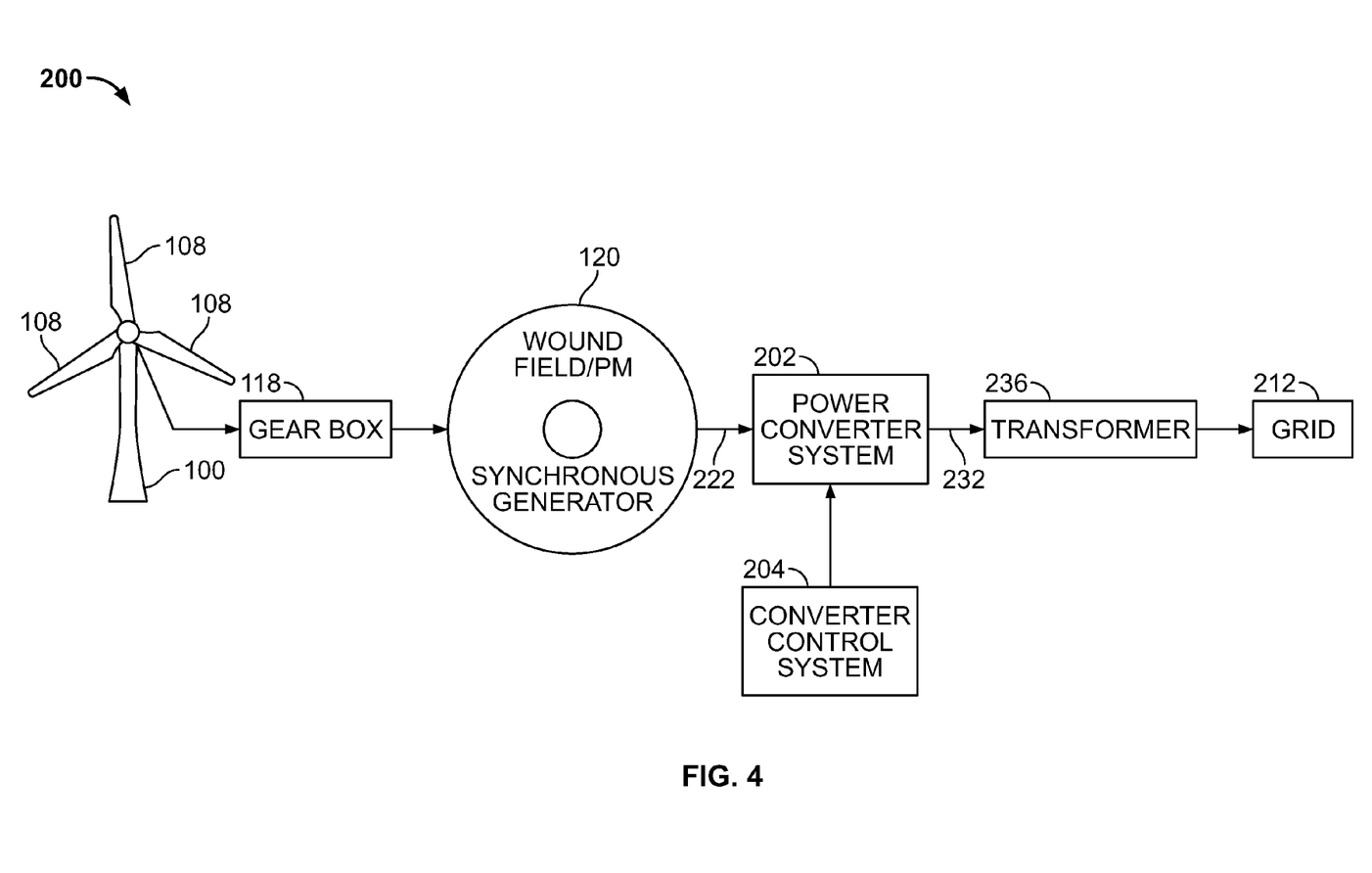
FIG. 4 is a block diagram of a power system that includes a power converter system, for example, the power converter system shown in FIG. 3.

FIG. 4 is a block diagram of an exemplary embodiment of power generation system 200, including generator 120 and power converter system 202 (shown in FIG. 3). Power converter system 202 is configured to receive input power 222 from generator 120 and provide output power 232 to load 212. As described above, wind turbine 100 is configured for converting wind energy to mechanical energy. Wind turbine 100 is coupled through gear box 118 to generator 120 or alternatively coupled directly to generator 120. Wind energy is captured by the rotation of blades 108, and generator 120 is configured for generating AC input power 222.

In the exemplary embodiment, power converter system 202 converts the variable frequency AC input power 222 received from generator 120 to fixed frequency output power 232. Power converter system 202 includes generator side converters and load side converters (not shown in FIG. 4). In an exemplary embodiment, power converter system 202 is a three-phase converter system. Other power converter systems 202 may alternatively be used, with one non-limiting example being a single phase system. In the exemplary embodiment, the output of power converter system 202 is provided to load 212 via a power distribution panel 234 (shown in FIG. 5) and a transformer 236.

Figure 5:
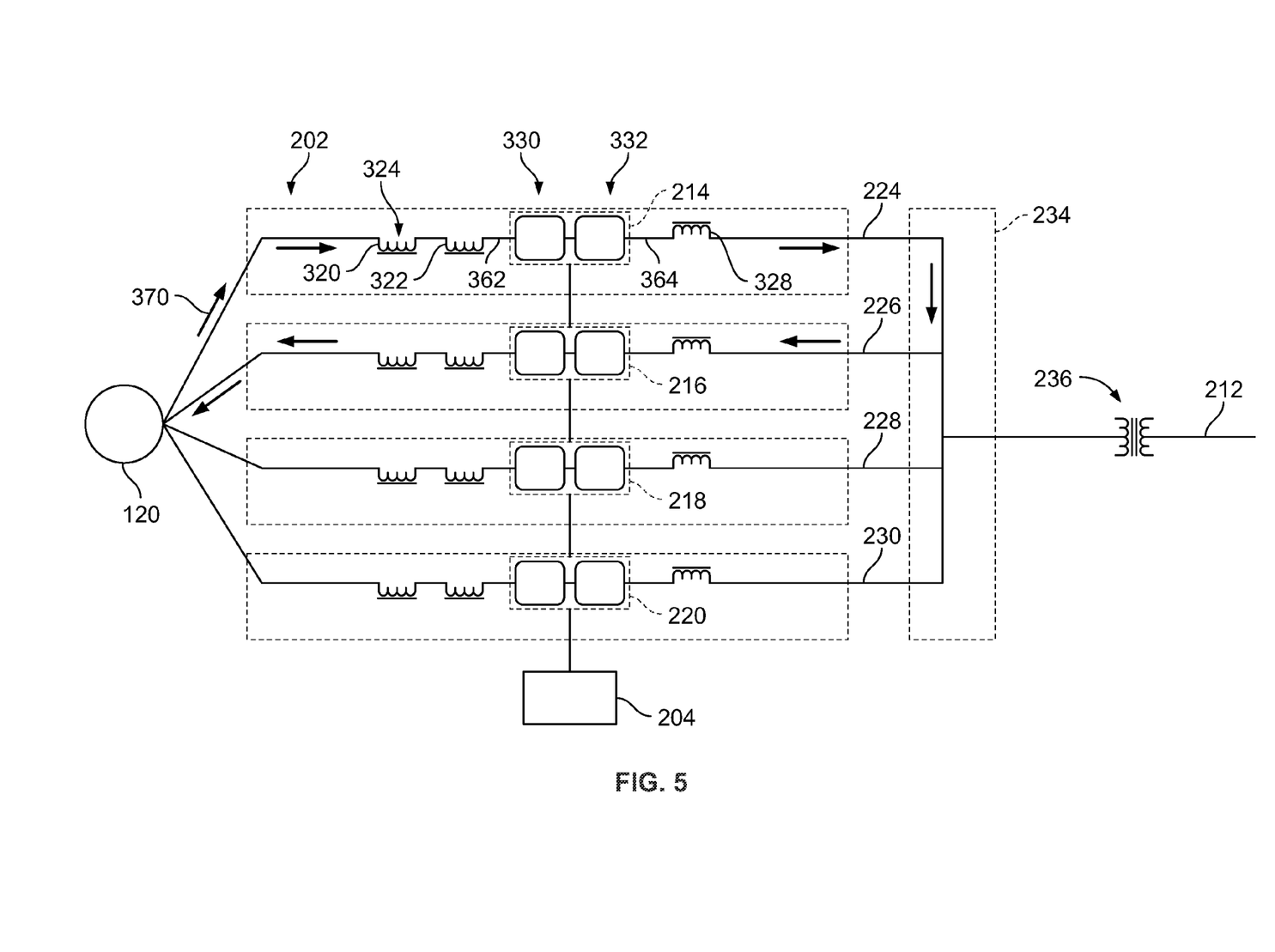
FIG. 5 is a block diagram of an exemplary embodiment of the power converter system shown in FIG. 4.

FIG. 5 is a block diagram of an exemplary embodiment of power converter system 202 (shown in FIG. 4). In the exemplary embodiment, power converter system 202 includes a plurality of converter threads, for example, first thread 224, second thread 226, third thread 228, and fourth thread 230. Although power converter system 202 is illustrated as including four converter threads 224, 226, 228, and 230, power converter system 202 may include any number of converter threads that allow power generation system 200 (shown in FIG. 3) to function as described herein. In the exemplary embodiment, input power generated by generator 120 is divided between converter threads 224, 226, 228, and 230. In an example where generator 120 generates two megawatts of electricity, each converter thread 224, 226, 228, and 230 receives approximately five-hundred kilowatts of electricity for conversion to an output power supplied to load 212.

In the exemplary embodiment, converter thread 224 includes a common mode inductor 320 coupled between generator 120 and a generator-side inductor 322. In the exemplary embodiment, common mode inductor 320 includes at least one air gap 324. Converter thread 224 also includes converter 214 coupled between generator-side inductor 322 and a load-side inductor 328. In the exemplary embodiment, converters 214, 216, 218, and 220 include a generator-side inverter 330 and a load-side inverter 332. In converter thread 224, generator-side inverter 330 is coupled between generator-side inductor 322 and load-side inverter 332. Load-side inverter 332 is further coupled to load-side inductor 328. Load-side inductor 328 is configured to provide output power to load 212, in certain embodiments, through power distribution panel 234 and/or transformer 236. In alternative embodiments, converter 214 and inductors 320, 322, and 328 may be positioned within converter thread 224 in any suitable order that enables converter system 202 to function as described herein.

In the exemplary embodiment, common mode inductor 320 is configured to provide common mode inductance which facilitates reducing a common mode current in first thread 224. In at least some embodiments, common mode inductor 320 includes three phase windings wound together on a single magnetic core leg (not shown in FIG. 5). Common mode current, for example, common mode current 370, may increase power losses in generator-side inductor 322 and/or load-side inductor 328 of converter thread 224. Power losses in inductors 322 and/or 328 reduce efficiency of power converter system 202. To facilitate increasing the efficiency of power converter system 202, a reduction in common mode current 370 may be facilitated by increasing the inductance value of common mode inductor 320. For example, the inductance value of common mode inductor 320 of power converter system 202 may be approximately doubled when compared to known power converter systems. More specifically, in at least one example, the inductance value of common mode inductor 320 may be doubled from four hundred milihenry (mH) to eight hundred mH. In another example, the inductance value of common mode inductor 320 is between one hundred mH and one henry (H). In yet another example, the inductance value of common mode inductor 320 is between six hundred mH and nine hundred mH.

In the exemplary embodiment, generator-side inductor 322 and load-side inductor 328 are configured to provide a three phase (e.g., normal mode) inductance. In at least some embodiments, generator-side inductor 322 and load-side inductor 328 include three phase windings wound on three separate magnetic core legs (not shown in FIG. 5) with a common return path. In the exemplary embodiment, generator-side inductor 322 and load-side inductor 328 provide relatively no common mode inductance when compared with common mode inductor 320. In the exemplary embodiment, converter threads 226, 228, and 230 are configured in a substantially similar manner as described above with respect to converter thread 224.

Figure 6:
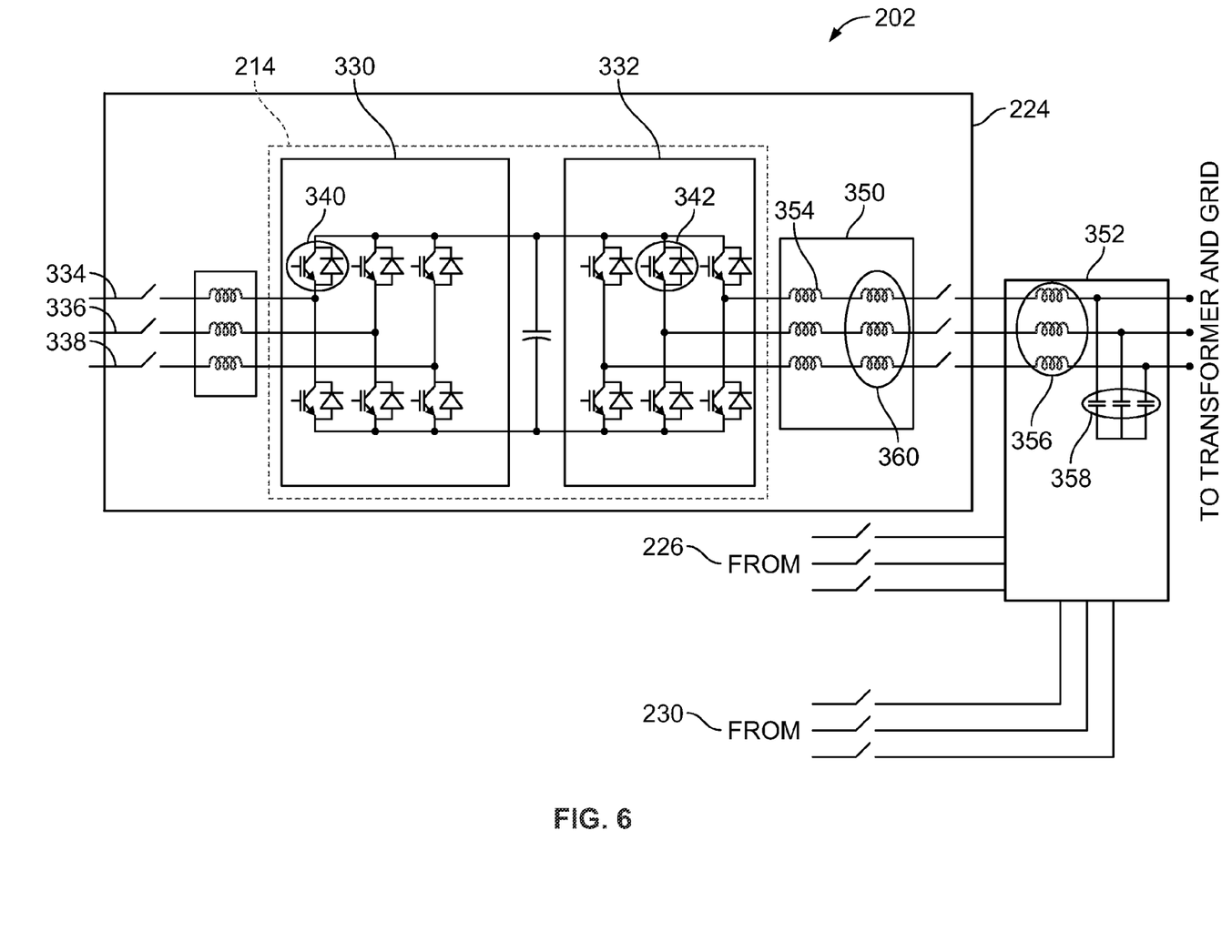
FIG. 6 is a block diagram of an exemplary embodiment of a converter thread included within the power converter system shown in FIG. 4.

FIG. 6 is a block diagram of an exemplary embodiment of converter thread 224 (shown in FIG. 3) included within power converter system 202 (shown in FIG. 3). Typically in wind turbine applications, power converter system 202 is a three phase power converter system. Although each converter thread 224, 226, 228, and 230 in FIG. 5 is illustrated in single-line form, the single-line may represent multiple phases. For example, the single-line representing converter thread 224 in FIG. 5 is shown in FIG. 6 as a three phase converter thread 224 that includes a first phase 334, a second phase 336, and a third phase 338. As described above, converter thread 224 includes converter 214. In the exemplary embodiment, converter 214 includes generator-side inverter 330 (also referred to as a generator converter bridge) and load-side inverter 332 (also referred to as a load converter bridge). Generator-side inverter 330 may be implemented using six power switches 340. Similarly, load-side inverter 332 may be implemented using six power switches 342. In some embodiments, power switches 340 and 342 are insulated gate bipolar transistors (IGBTs). However, other types of power switches including, but not limited to, integrated gate commutated thrusters (IGCTs or GCTs) or MOSFETs, may be included within inverters 330 and 332. Switches 340 and 342 are switched at predetermined frequencies to generate an output power having a desired output voltage and frequency. A waveform combiner 350 may be included within each thread and coupled to an overall pulse width modulated (PWM) filter 352 for power converter system 202. Waveform combiner 350 includes differential mode chokes 354 which are sufficiently large to enable interleaved gating. This is in contrast to any smaller size differential mode chokes which are needed to minimize unbalanced current sharing with conventional non-interleaved converter systems. PWM filter 352 includes inductive components 356 and capacitive components 358.

Differential mode chokes 354 in waveform combiners 350 provide some or all of the total inductance in PWM filter 352 and suppress the high frequency (e.g., switching frequency range) differential mode cross current which results from the interleaved gating control. When used, a common mode choke 360 in waveform combiner 350 suppresses the high frequency common mode cross-current that links both generator-side inverters 330 and load-side inverters 332. The filtered output from PWM filter 352 is provided to load 212 (shown in FIG. 5).

Referring further to FIG. 5, in the exemplary embodiment, converter control system 204 is coupled to converters 214, 216, 218, and 220. In the exemplary embodiment, converter control system 204 controls a switching pattern and/or a switching frequency of switches that are included within converter 214, for example, switches 340 and 342 (shown in FIG. 6). In some embodiments, converter control system 204 is configured to operate converter 214, converter 216, converter 218, and converter 220 in a fully-interleaved pattern. For example, converter control system 204 may provide converter 214, converter 216, converter 218, and converter 220 with phase displaced gating signals to facilitate reducing overall switching harmonic components due to cancellation of phase shifted switching waveforms. More specifically, in a fully-interleaved switching pattern, converters 214, 216, 218, and 220, are switched in an interleaved pattern. For example, converter 214 may be switched ninety degrees out of phase from converter 216 and converter 220, converter 216 may be switched ninety degrees out of phase from converter 218, and converter 218 may be switched ninety degrees out of phase from converter 220. In a fully-interleaved switching pattern, generator-side inverters 330 and load-side inverters 332 of converters 214, 216, 218, and 220 are switched at substantially the same time.

In the exemplary embodiment, converter control system 204 is also configured to switch converters 214, 216, 218, and 220 in a half-interleaved pattern. For example, converter 214 and converter 218 are switched one-hundred and eighty degrees out of phase from converter 216 and converter 220. Alternatively, any two converters 214, 216, 218, and 220 may be grouped together so long as two converters are switched at a phase one-hundred and eighty degrees apart from the remaining two converters. Similarly to the fully-interleaved switching pattern described above, generator-side inverters 330 and load-side inverters 332 are switched in phase with one another.

Typically, increasing switching frequency of a converter may facilitate smoothing of a converter output power. However, increasing switching frequency may result in reduced efficiency of the converter system. The half-interleaved switching pattern described herein facilitates increasing switching frequency without reducing an efficiency when compared to a fully-interleaved system. For example, a half-interleaved switching pattern as described herein may be performed at approximately 2.8 kHz and retain an efficiency substantially similar to, or greater than, an efficiency of a converter using a fully-interleaved switching pattern performed at 1.4 kHz.

In the exemplary embodiment, converter control system 204 dynamically changes between switching patterns. In the exemplary embodiment, converter control system 204 dynamically changes between a half-interleaved switching pattern and a fully-interleaved switching pattern based on input power 222 (shown in FIG. 3) provided by generator 120. In general, power output by generator 120 (i.e., input power 222) increases according to a predefined curve with increasing generator speed (i.e., speed of rotor rotation). Therefore, input power 222 provided to converter system 202 may be determined by, for example, monitoring a speed of rotation of generator 120, a voltage output by generator 120, and/or a modulation index. In the exemplary embodiment, in addition to dynamically changing between switching patterns, converter control system 204 may also change between various switching frequencies (also referred to herein as chopping frequencies). For example, converter control system 204 may change between a switching frequency of 1.4 kHz and 2.8 kHz.

In the exemplary embodiment, when input power 222 applied to converter system 202 is below a switchover power level, converter control system 204 switches converters 214, 216, 218, and 220 in a half-interleaved pattern. In the exemplary embodiment, when input power 222 applied to converter system 202 is above the switchover power level, converter control system 204 switches converters 214, 216, 218, and 220 in a fully-interleaved pattern. The switchover power level is a power level where losses for a fully-interleaved system and a half-interleaved system are approximately equal. Below the switchover power level a half-interleaved switching pattern is more efficient than a fully-interleaved switching pattern. Above the switchover power level the fully-interleaved switching pattern is more efficient than the half-interleaved switching pattern. More specifically, in the exemplary embodiment, below the switchover power level the half-interleaved switching pattern is provided at a predetermined chopping frequency and above the switchover power level a fully-interleaved switching pattern is provided at a chopping frequency that is half that of the half-interleaved chopping frequency.

In the exemplary embodiment, the switchover power level may be calculated, determined through testing, or determined using any other suitable method of measuring converter system losses. In an alternative embodiment, a first predetermined power level is determined that is less than the switchover power level and a second predetermined power level is determined that is greater than the switchover power level. In the alternative embodiment, when input power 222 applied to converter system 202 is below the first predetermined power level, converter control system 204 switches converters 214, 216, 218, and 220 in a half-interleaved pattern. In the alternative embodiment, when input power 222 applied to converter system 202 is above the second predetermined power level, converter control system 204 switches converters 214, 216, 218, and 220 in a fully-interleaved pattern. The first and second predetermined power levels provide hysteresis which facilitates reducing noise.

As described above, output power 232 (shown in FIG. 3) may be supplied to load 212 via power distribution panel 234 and/or transformer 236. Transformer 236 may be a single transformer or multiple transformers configured to couple power converter system 202 to load 212. Power distribution panel 234 may include a plurality of load-side waveform combiners (not shown in FIG. 5). Each load-side inverter 332 may be coupled on one side to respective generator-side inverters 330 and on another side to transformer 236 by respective load-side waveform combiners (not shown in FIG. 5). In the exemplary embodiment, each load-side inverter 332 is coupled to the primary winding (not shown in FIG. 5) of transformer 236 and the secondary winding (not shown in FIG. 5) of the transformer 236 is coupled to load 212.

In the above described embodiments, the waveform combiners (not shown in FIG. 5) are used to combine the phase displaced switching waveforms from generator-side inverters 330 and load-side inverters 332. Sufficient harmonic reduction is provided so that lower converter switching frequencies may be used while maintaining a quality of output power 232.

Figure 7:
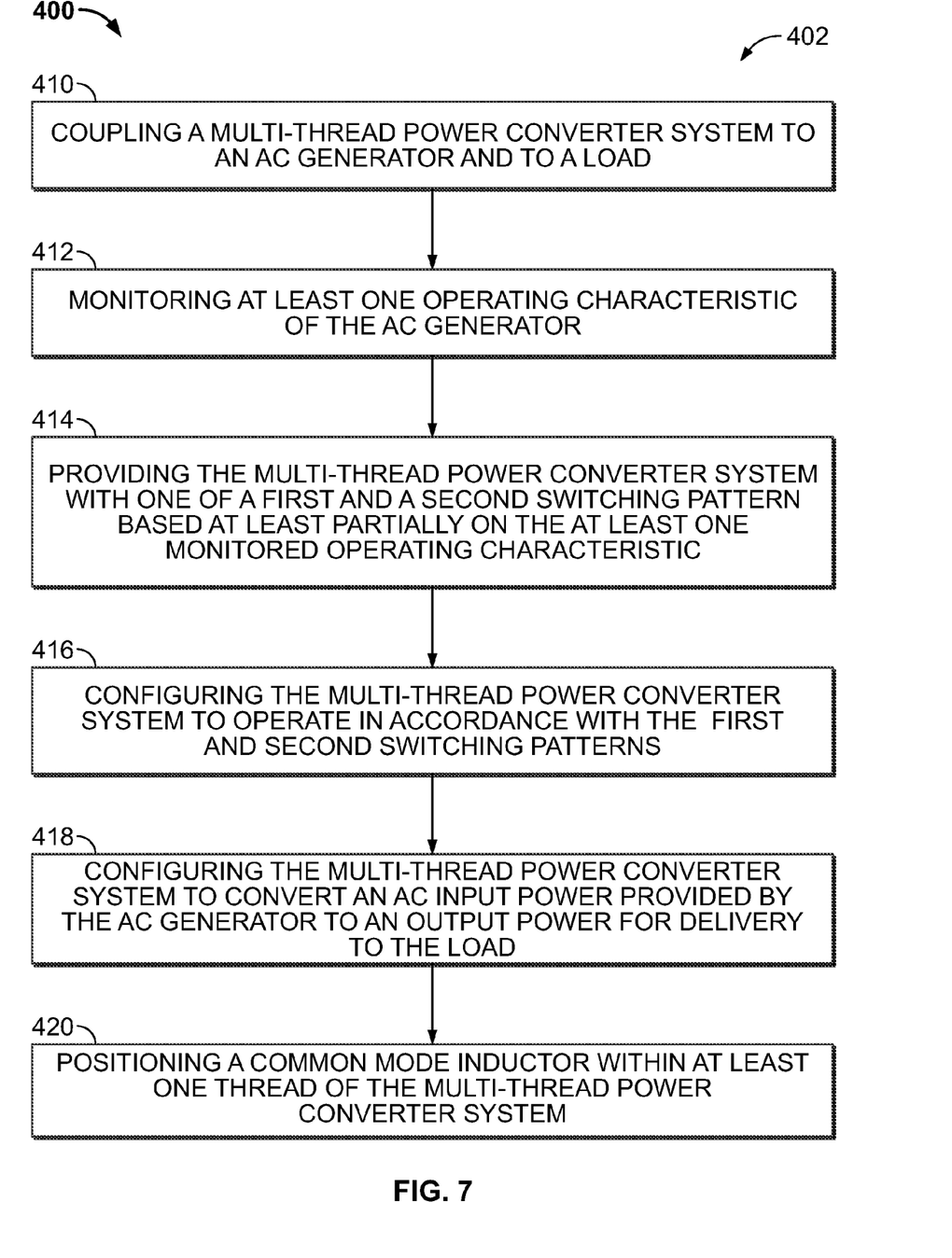
FIG. 7 is a flow chart illustrating a method for providing an output power to a load.

FIG. 7 is a flow chart 400 illustrating a method 402 for providing an output power to a load, such as load 212 shown in FIG. 5. In the exemplary embodiment, method 402 includes coupling 410 a multi-thread power converter system to an alternating current generator and to a load, for example, coupling 410 multi-thread power converter system 202 (shown in FIG. 5) to alternating current generator 120 (shown in FIG. 5) and to load 212 (shown in FIG. 5). In the exemplary embodiment, coupling 410 includes coupling 410 multi-thread power converter system 202 to a variable frequency alternating current generator, for example, generator 120, and to a substantially fixed frequency load, for example, load 212.

In the exemplary embodiment, method 402 also includes monitoring 412 at least one operating characteristic of generator 120. As described above, the switching pattern applied to converter system 202 may be dependent upon an operating characteristic of generator 120, for example, a power output by generator 120 and delivered to converter system 202. In general, a power output by generator 120 increases according to a predefined curve with increasing generator speed (i.e., speed of rotor rotation). Therefore, input power provided to converter system 202 may be determined by, for example, monitoring 412 a speed of rotation of generator 120, a voltage output by generator 120, and/or a modulation index.

In the exemplary embodiment, method 402 also includes providing 414 converter system 202 with one of a first switching pattern and a second switching pattern based at least partially on the monitored operating characteristics. In the exemplary embodiment, the first switching pattern is provided when the monitored operating characteristics indicate that input power 222 from generator 120 is below a first predetermined level. Alternatively, the second switching pattern is provided when the monitored operating characteristics indicate that input power 222 from generator 120 is above a second predetermined level. As described above, the first and second predetermined levels may be equal, or may also be different to facilitate reducing noise. In the exemplary embodiment, the first switching pattern and the second switching pattern are each one of a half-interleaved switching pattern, a fully-interleaved switching pattern, or a non-interleaved switching pattern. In a particular embodiment, a half-interleaved switching pattern is provided when the monitored operating characteristics indicate that input power 222 from generator 120 is below a predetermined level and a fully-interleaved switching pattern is provided when the monitored operating characteristics indicate that input power 222 from generator 120 is above the predetermined level.

In the exemplary embodiment, method 402 also includes configuring 416 converter system 202 to operate in accordance with the first switching pattern or the second switching pattern. Method 402 also includes configuring 418 converter system 202 to convert the AC input power 222 provided by an AC generator to an output power for delivery to a load, for example, load 212 (shown in FIG. 5). For example, in an exemplary embodiment, power converter system 202 is configured to operate in accordance with multiple switching patterns and to convert input power 222 provided by generator 120 (shown in FIG. 5) to output power 232 for delivery to load 212 (shown in FIG. 5). Generator-side inverter 330 (shown in FIG. 5) may also be configured to convert input power 222 to a direct current power and load-side inverter 332 (shown in FIG. 5) may be configured to convert the direct current power to output power 232. In an exemplary embodiment, phase displaced gating signals are provided to each of a plurality of threads, for example, threads 224, 226, 228, and 230 (shown in FIG. 5), included within multi-thread power converter system 202.

In the exemplary embodiment, a first thread and a second thread of the multi-thread power converter system, for example, thread 224 and thread 226 of power converter system 202, are provided with a first switching phase and a third thread and a fourth thread, for example thread 228 and thread 230, are provided with a second switching phase. In the exemplary embodiment, the first switching phase and the second switching phase are one-hundred and eighty degrees out of phase.

Method 402 may also include positioning 420 a common mode inductor, for example, common mode inductor 320 (shown in FIG. 5), within at least one thread of the multi-thread power converter system, for example, thread 224 of power converter system 202. The common mode inductor 320 is configured to reduce a common mode current, for example, common mode current 370 (shown in FIG. 5), within thread 224.

Figure 8:
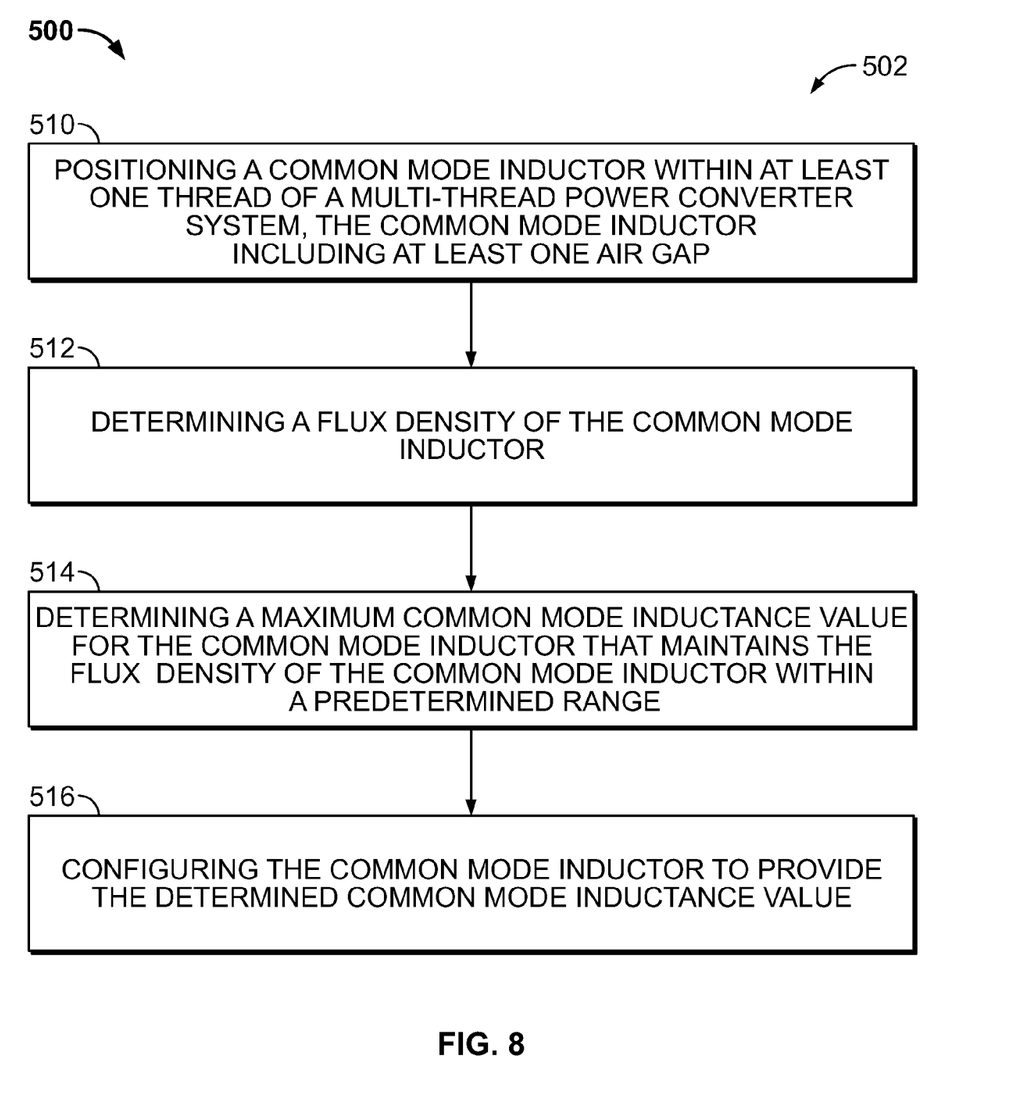
FIG. 8 is a flow chart illustrating a method for increasing an efficiency of a multi-thread power converter system.

FIG. 8 is a flow chart 500 illustrating a method 502 for increasing an efficiency of a multi-thread power converter system, for example, multi-thread power converter system 202 (shown in FIG. 5). In the exemplary embodiment, method 502 includes positioning 510 a common mode inductor within at least one thread of a multi-thread power converter system, for example, common mode inductor 320 within thread 224 of multi-thread power converter system 202. Common mode inductor 320 includes at least one air gap 324 (shown in FIG. 5). In certain embodiments, positioning 510 common mode inductor 320 within thread 224 of multi-thread power converter system 202 may include positioning common mode inductor 320 within thread 224 of a multi-thread power converter system configured to operate in accordance with a half-interleaved switching pattern.

In the exemplary embodiment, method 502 also includes determining 512 a flux density of the common mode inductor. Furthermore, method 502 also includes determining 514 a maximum common mode inductance value for common mode inductor 320 that maintains the flux density of common mode inductor 320 within a predetermined range. In the exemplary embodiment, the flux density predetermined range facilitates preventing common mode inductor 320 from becoming saturated. In other words, in the exemplary embodiment, by maintaining the flux density within the predetermined range, common mode inductor 320 will not become saturated. Furthermore, in the exemplary embodiment, the common mode inductance value is maximized while maintaining the flux density below a saturation level.

In the exemplary embodiment, method 502 also includes configuring 516 the common mode inductor to provide the determined common mode inductance value. For example, configuring 516 may include reducing the at least one air gap, which facilitates increasing the common mode inductance value of common mode inductor 320. Although, as described herein, the inductance value of common mode inductor 320 is increased by reducing the at least one air gap, the inductance value of common mode inductor 320 may also be increased in any suitable manner that allows multi-thread power converter system 202 (shown in FIG. 5) to function as described herein. In certain embodiments, adjusting the at least one air gap to achieve the determined common mode inductance value includes pre-setting a fixed common mode inductor air gap. In other embodiments, an adjustable air gap may be included in the common mode inductor, which may be positioned to achieve the determined common mode inductance value. As described above, in at least one example, the inductance value of common mode inductor 320 of power converter system 202 may be approximately doubled when compared to known power converter systems. More specifically, in at least one example, the inductance value of common mode inductor 320 may be doubled from four hundred milihenry (mH) to eight hundred mH. In another example, the inductance value of common mode inductor 320 is between one hundred mH and one henry (H). In yet another example, the inductance value of common mode inductor 320 is between six hundred mH and nine hundred mH.

The methods and systems described herein may be further configured to operate with fault redundant operation capability. For example, faulty converter threads may be isolated from the remaining converter threads. The switching patterns, for example, the half-interleaved gating pattern, can be adjusted such that the remaining converter threads can still produce an output of high power quality.

Described herein are exemplary methods and systems for improving efficiency of a wind turbine power converter system. More specifically, the methods and systems described herein facilitate reducing losses in the power converter by reducing the common mode current in the power converter. The methods and systems described herein may reduce the common mode current by increasing a value of a common mode choke. The methods and systems described herein may also facilitate reducing losses in the power converter by dynamically switching between switching patterns and/or chopping frequencies based at least partially on a generator output level.

The methods and systems described herein facilitate efficient and economical conversion of power generated by a wind turbine. Exemplary embodiments of methods and systems are described and/or illustrated herein in detail. The methods and systems are not limited to the specific embodiments described herein, but rather, components of each system, as well as steps of each method, may be utilized independently and separately from other components and steps described herein. Each component, and each method step, can also be used in combination with other components and/or method steps.

When introducing elements/components/etc. of the methods and systems described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for providing an output power to a load, said method comprising:
coupling a multi-thread power converter system to an alternating current (AC) generator and to a load;
monitoring at least one operating characteristic of the AC generator;

providing the multi-thread power converter system with one of a first switching pattern and a second switching pattern based at least partially on the monitored operating characteristic;

configuring the multi-thread power converter system to operate in accordance with the first switching pattern and the second switching pattern; and, configuring the multi-thread power converter system to convert an AC input power provided by the AC generator to an output power for delivery to the load.

2. A method in accordance with claim 1, wherein monitoring at least one operating characteristic of the AC generator comprises monitoring at least one of a speed of rotation of the AC generator, a voltage output by the AC generator, and a modulation index, wherein the at least one operating characteristic substantially corresponds to the AC input power.

3. A method in accordance with claim 1, wherein providing one of a first switching pattern and a second switching pattern comprises:

providing the first switching pattern when monitored operating characteristics indicate the AC input power is below a switchover power level; and, providing the second switching pattern when monitored operating characteristics indicate the AC input power is above the switchover power level.

4. A method in accordance with claim 3, wherein providing one of a first switching pattern and a second switching pattern further comprises:

determining a first power level that is less than the switchover power level;

determining a second power level that is greater than the switchover power level;

transitioning from the first switching pattern to the second switching pattern when the AC input power increases past the second power level; and, transitioning from the second switching pattern to the first switching pattern when the AC input power decreases past the first power level.

5. A method in accordance with claim 1, wherein providing one of a first switching pattern and a second switching pattern comprises providing one of a fully-interleaved switching pattern, a half-interleaved switching pattern, and a non-interleaved switching pattern.

6. A method in accordance with claim 5, wherein providing the multi-thread power converter system with the half-interleaved switching pattern comprises providing a first thread and a second thread of the multi-thread power converter system with a first switching phase, and a third thread and a fourth thread of the multi-thread power converter system with a second switching phase, wherein the first switching phase and the second switching phase are one-hundred and eighty degrees out of phase.

7. A method in accordance with claim 1, wherein providing one of a first switching pattern and a second switching pattern comprises providing each of a plurality of threads included within the multi-thread power converter system with phase displaced gating signals.

8. A method in accordance with claim 1, further comprising providing the first switching pattern at a first chopping frequency and providing the second switching pattern at a second chopping frequency, wherein the second chopping frequency is lower than the first chopping frequency.

9. A method in accordance with claim 8, wherein providing a first switching pattern and a second switching pattern comprises:

providing the first switching pattern at the first chopping frequency when monitored operating characteristics indicate the AC input power is below the switchover power level; and, providing the second switching pattern at the second chopping frequency when monitored operating characteristics indicate the AC input power is above the switchover power level.

10. A method in accordance with claim 1, further comprising positioning a common mode inductor within at least one thread of the multi-thread power converter system, the common mode inductor configured to reduce a common mode current within the thread.

11. A method in accordance with claim 10, further comprising maximizing an inductance value of the common mode inductor while maintaining a common mode inductor flux density within a range.

12. A method in accordance with claim 1, wherein coupling the multi-thread power converter system to the AC generator and to the load comprises coupling the multi-thread power converter system to a wind turbine generator configured to generate a variable frequency AC input power and coupling the multi-thread power converter system to a substantially fixed frequency load.

13. A power generation system for providing an output power to a load, said power generation system comprising:

a generator configured to generate an alternating current (AC) input power;

a power converter system coupled to said generator, said power converter system comprising a plurality of converter threads configured to convert the AC input power to an output power and to provide the output power to the load; and, a converter control system coupled to said power converter system, said converter control system configured to provide said power converter system with one of a first switching pattern and a second switching pattern based at least partially on a monitored operating characteristic of said generator.

14. A power generation system in accordance with claim 13, wherein said generator is included within a wind turbine.

15. A power generation system in accordance with claim 13, wherein said plurality of converter threads comprise a generator-side inverter, a load-side inverter, and a plurality of inductors.

16. A power generation system in accordance with claim 15, wherein said plurality of inductors comprise at least one of a generator-side inductor and a load-side inductor configured to provide normal mode inductance to said power converter system.

17. A power generation system in accordance with claim 15, wherein said plurality of inductors comprise at least one common mode inductor configured to provide common mode inductance to said power converter system, wherein common mode inductance facilitates a reduction of common mode current within said power converter system.

18. A power generation system in accordance with claim 17, wherein said common mode inductor includes an air gap determined to provide a maximum inductance value while maintaining a flux density of the common mode inductor within a range.

19. A power generation system in accordance with claim 13, wherein said monitored operating characteristic includes at least one of a speed of rotation of said generator, a voltage output by said generator, and a modulation index, wherein said monitored operating characteristic substantially corresponds to an AC input power level.

20. A power generation system in accordance with claim 13, wherein said first switching pattern and said second switching pattern include at least one of a fully-interleaved switching pattern, a half-interleaved switching pattern, and a non-interleaved switching pattern.

21. A power generation system in accordance with claim 13, wherein said converter control system is configured to provide the first switching pattern when said monitored operating characteristic indicates that the AC input power is below a switchover level and to provide the second switching pattern when said monitored operating characteristic indicates that the AC input power is above the switchover level.

22. A power generation system in accordance with claim 21, wherein said first switching pattern comprises a half-interleaved switching pattern and said second switching pattern comprises a fully-interleaved switching pattern.

23. A power generation system in accordance with claim 13, wherein said converter control system is configured to provide the first switching pattern at a first chopping frequency and the second switching pattern at a second chopping frequency, wherein the second chopping frequency is lower than the first chopping frequency.

24. A power generation system in accordance with claim 13, wherein said converter control system is configured to provide a first converter thread and a second converter thread of said plurality of converter threads with a first switching phase, and a third converter thread and a fourth thread of the plurality of converter threads with a second switching phase, wherein the first switching phase and the second switching phase are one-hundred and eighty degrees out of phase.

25. A method for increasing an efficiency of a multi-thread power converter system, said method comprising:
  positioning a common mode inductor within at least one thread of a multi-thread power converter system, the common mode inductor including at least one air gap;
  determining a flux density of the common mode inductor;
  determining a maximum common mode inductance value for the common mode inductor that maintains the flux density of the common mode inductor within a predetermined range; and,
  configuring the common mode inductor to provide the determined common mode inductance value.

26. A method in accordance with claim 25, wherein determining the common mode inductance value comprises determining the common mode inductance value that maintains the flux density below a saturation level while maximizing the common mode inductance value.

27. A method in accordance with claim 25, wherein configuring the common mode inductor to provide the determined common mode inductance value comprises adjusting the at least one air gap to set the common mode inductance value of the common mode inductor.

28. A method in accordance with claim 26, wherein adjusting the at least one air gap to set the common mode inductance value comprises at least one of pre-setting a fixed common mode inductor air gap and providing the common mode inductor with an adjustable air gap.

29. A method in accordance with claim 25, further comprising applying a first switching pattern to the multi-thread power converter system when an input power supplied to the multi-thread power converter system is below a first switchover level and applying a second switching pattern to the multi-thread power converter system when the input power supplied to the multi-thread power converter system is above the first switchover level.

* * * * *